United States Patent
Han et al.

(10) Patent No.: US 11,733,089 B2
(45) Date of Patent: Aug. 22, 2023

(54) CONTEXT ENCODER-BASED FIBER SENSING ANOMALY DETECTION

(71) Applicant: NEC Laboratories America, Inc., Princeton, NJ (US)

(72) Inventors: Shaobo Han, Princeton, NJ (US); Ming-Fang Huang, Princeton, NJ (US); Eric Cosatto, Red Bank, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/556,939

(22) Filed: Dec. 20, 2021

(65) Prior Publication Data

US 2022/0196464 A1 Jun. 23, 2022

Related U.S. Application Data (60) Provisional application No. 63/128,960, filed on Dec. 22, 2020.

(51) Int. Cl.
*G01H 9/00* (2006.01)
*H04B 10/071* (2013.01)

(52) U.S. Cl.
CPC ............ *G01H 9/004* (2013.01); *H04B 10/071* (2013.01)

(58) Field of Classification Search
CPC ..................................................... H04B 10/071
See application file for complete search history.

(56) References Cited

U.S. PATENT DOCUMENTS

2020/0249076 A1* 8/2020 Ip ........................... G01H 9/004

OTHER PUBLICATIONS

Deepak Pathak et al, "Context Encoders: Features Learning by Inpainting", 2016, IEEE, pp. 2536-2544. (Year: 2016).*

* cited by examiner

*Primary Examiner* — Kevin K Pyo
(74) *Attorney, Agent, or Firm* — Joseph Kolodka (57) ABSTRACT

Aspects of the present disclosure describe an unsupervised context encoder-based fiber sensing method that detects anomalous vibrations proximate to a sensor fiber that is part of a distributed fiber optic sensing system (DFOS) such that damage to the sensor fiber by activities producing and anomalous vibrations are preventable. Advantageously, our method requires only normal data streams and a machine learning based operation is utilized to analyze the sensing data and report abnormal events related to construction or other fiber-threatening activities in real-time. Our machine learning algorithm is based on waterfall image inpainting by context encoder and is self-trained in an end-to-end manner and extended every time the DFOS sensor fiber is optically connected to a new route. Accordingly, our inventive method and system it is much easier to deploy as compared to supervised methods of the prior art.

4 Claims, 11 Drawing Sheets

FIG. 1

*Prior Art*

CONTEXT ENCODER-BASED FIBER SENSING ANOMALY DETECTION

CROSS REFERENCE TO RELATED APPLICATIONS

This application claims the benefit of U.S. Provisional Patent Application Ser. No. 63/128,960 filed 22 Dec. 2020 the entire contents of which is incorporated by reference as if set forth at length herein.

TECHNICAL FIELD

This disclosure relates generally to distributed fiber optic sensing (DFOS). More particularly, it pertains to a context encoder-based fiber sensing anomaly detection method for determining environmental conditions that may threaten the integrity of a deployed fiber optic cable.

BACKGROUND

As will be understood by those skilled in the art, fiber optic communication systems have been widely deployed for telecommunications purposes including—among others—Internetworking, i.e., Internet, World-Wide-Web, etc., Cellular telephony, i.e., LTE/5G front haul/backhaul. Although fiber optic cable that provides a communications medium for such telecommunications is typically buried in the ground at depths >4 feet, it is nevertheless subject to frequent cuts—mostly due to construction activities proximate to the fiber optic cable. Once a fiber optic cable is cut, there is a resulting halt in signal transmission. Consequently, systems, methods, and structures that prevent or otherwise minimize the occurrence of such fiber optic cable cuts would be a welcome addition to the art.

SUMMARY

An advance in the art is made according to aspects of the present disclosure directed to systems, methods, and structures for determining physical threats to deployed fiber optic cable before such threats materialize into physical damage.

In sharp contrast to the prior art, our inventive method employs an inventive, unsupervised context encoder-based operation that requires only normal data streams. A machine learning based operation is utilized to analyze the sensing data and report abnormal events related to construction or other fiber-threatening activities in real-time. Our machine learning algorithm is based on waterfall image inpainting by context encoder and is self-trained in an end-to-end manner and extended every time the DFOS sensor fiber is optically connected to a new route. Accordingly, our inventive method and system it is much easier to deploy as compared to supervised methods of the prior art.

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

Figure 1:
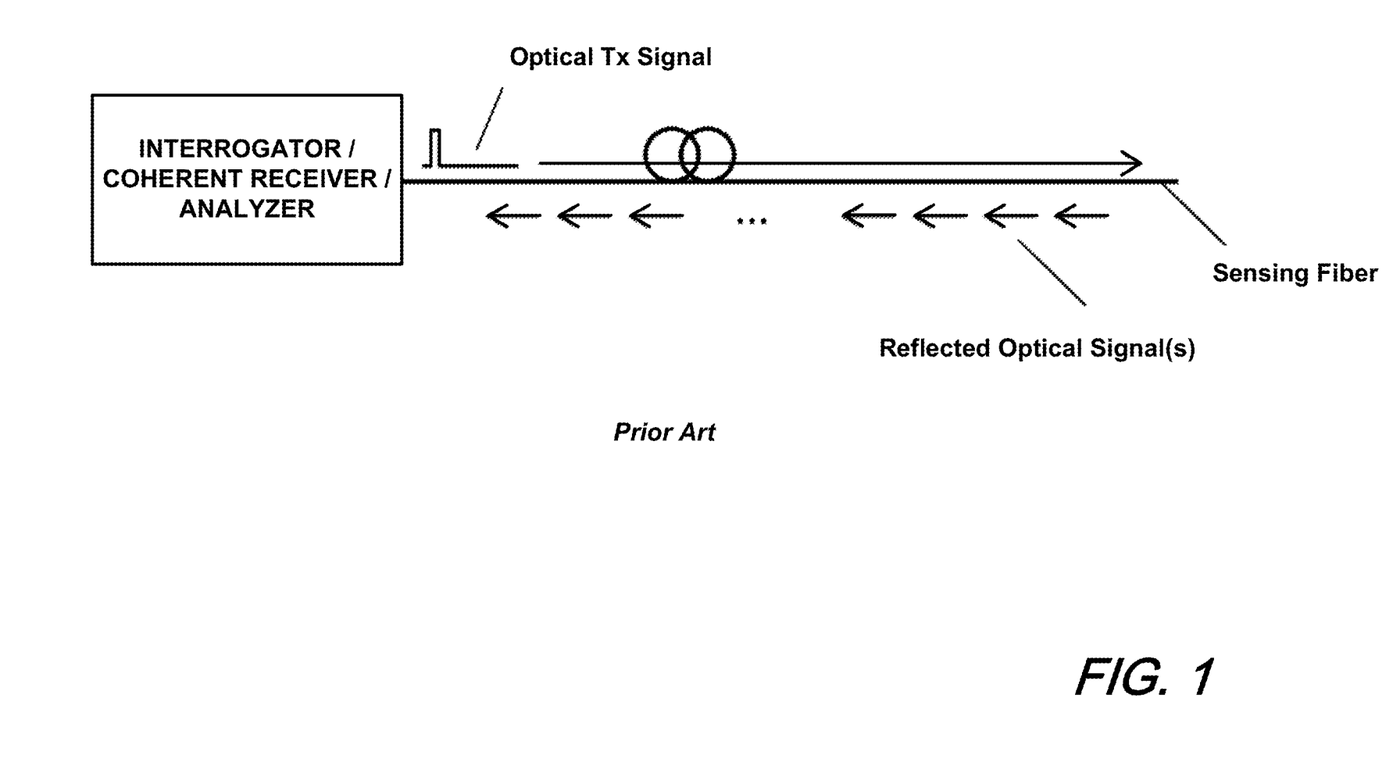
FIG. 1 is a schematic diagram of an illustrative DFOS arrangement as is known in the art.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

We note once more that one aspect of the present disclosure describes using existing deployed fiber optic cable as a sensing media to detect/determine abnormal vibrations proximate to the sensing fiber. Abnormal events (e.g. excavator, drilling rig, jackhammer, etc.) can be automatically discovered by distributed fiber optic sensing (DFOS) technologies early—before cable cut events happen. A machine learning based system is utilized to analyze the sensing data and report abnormal events related to operations and/or fiber maintenance personnel/systems in real-time. As we shall show and describe, our machine learning methodology is based on a waterfall image inpainting by context encoder.

We note additionally that supervised anomaly detection methods require human labeling of anomaly pixels, which is hard to create. Moreover, such supervised anomaly detection can only generalize to fiber routes with very similar routes conditions and abnormal patterns, which are both unrealistic. In practice, the signal characteristics in fiber sensing can vary according to a great number of factors, such as cable-ground coupling, soil type, buried depth, etc. Meanwhile, abnormal patterns are different with the type and action of construction machines.

In sharp contrast, our context encoder-based method according to aspects of the present disclosure is unsupervised and requires only normal DFOS data streams. It can be self-trained in an end-to-end fashion, that is, every time the DFOS sensor (i.e., DAS) is connected to a new route. Therefore, it is easier to deploy than the supervised techniques of the prior art.

By leveraging Rayleigh back-scattering effects, related dynamics of the surrounding effects can be sensed by DFOS systems at any point along an entire optical fiber route. According to aspects of the present disclosure, by comparing environmental vibrations (e.g. regular road traffic, bridge, etc.), and construction activities (e.g. excavator digging, etc.) our inventive methods generate and differentiate distinctive patterns that are shown on waterfall images. Our context encoder-based anomaly detection system and method then discovers/determines construction events that may damage the optical fiber—early—before the optical fiber cable is cut. As will be readily understood and appreciated by those skilled in the art, our inventive system and methods save manual inspection effort(s) which are tedious, error-prone, and expensive.

We note further that our inventive method is reconstruction-based—in which we reconstruct normal vibration patterns only—such as traffic—and identify any abnormal regions via thresholding reconstruction errors.

Previously, convolutional autoencoder based approaches that receive an input image and try to reconstruct itself has been applied to anomaly detection. Such methods, even with small model capacity, can memorize and reconstruct not only the normal waterfall images but also the abnormal ones, to similar levels of quality, due to: 1) vibration patterns on waterfall images are simpler but more noisy than natural images; and 2) field data is more sophisticated, and includes mixed patterns than data collected in a controlled, lab environment. Training with standard convolutional autoencoder will force the model to inherently learn a diverse set of dictionaries, which is expressive enough to reconstruct unseen abnormal vibration events.

We note that normal traffic patterns from a local region are similar with a regular slope pattern.

In the context-encoder based scheme according to aspects of the present disclosure, the central part of waterfall image is first removed, and the model is trained to predict the missing region using context information provided in surrounding regions. In this way, our model is "forced" to learn structure information in waterfall images.

We note that when there are construction events in a test scene, the learned regime under normal scenarios is violated and the model does not reconstruct the missing regions well and yields reconstruction errors.

Figure 2A:
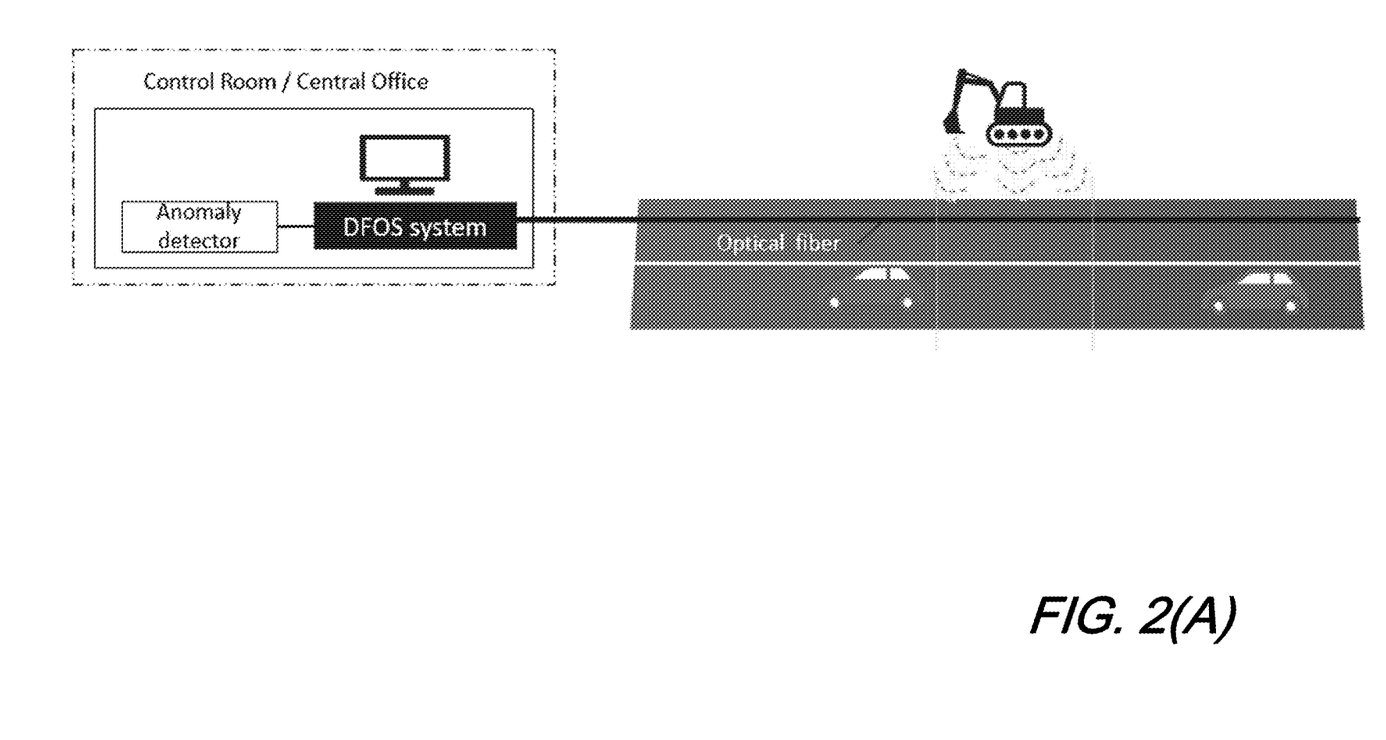
FIG. 2(A) and FIG. 2(B) show illustrative system layout of a sensing layer overlaid on a deployed optical fiber and a schematic received waterfall image from the fiber by DFOS that includes normal road traffic and constructions according to aspects of the present disclosure.
Figure 2B:
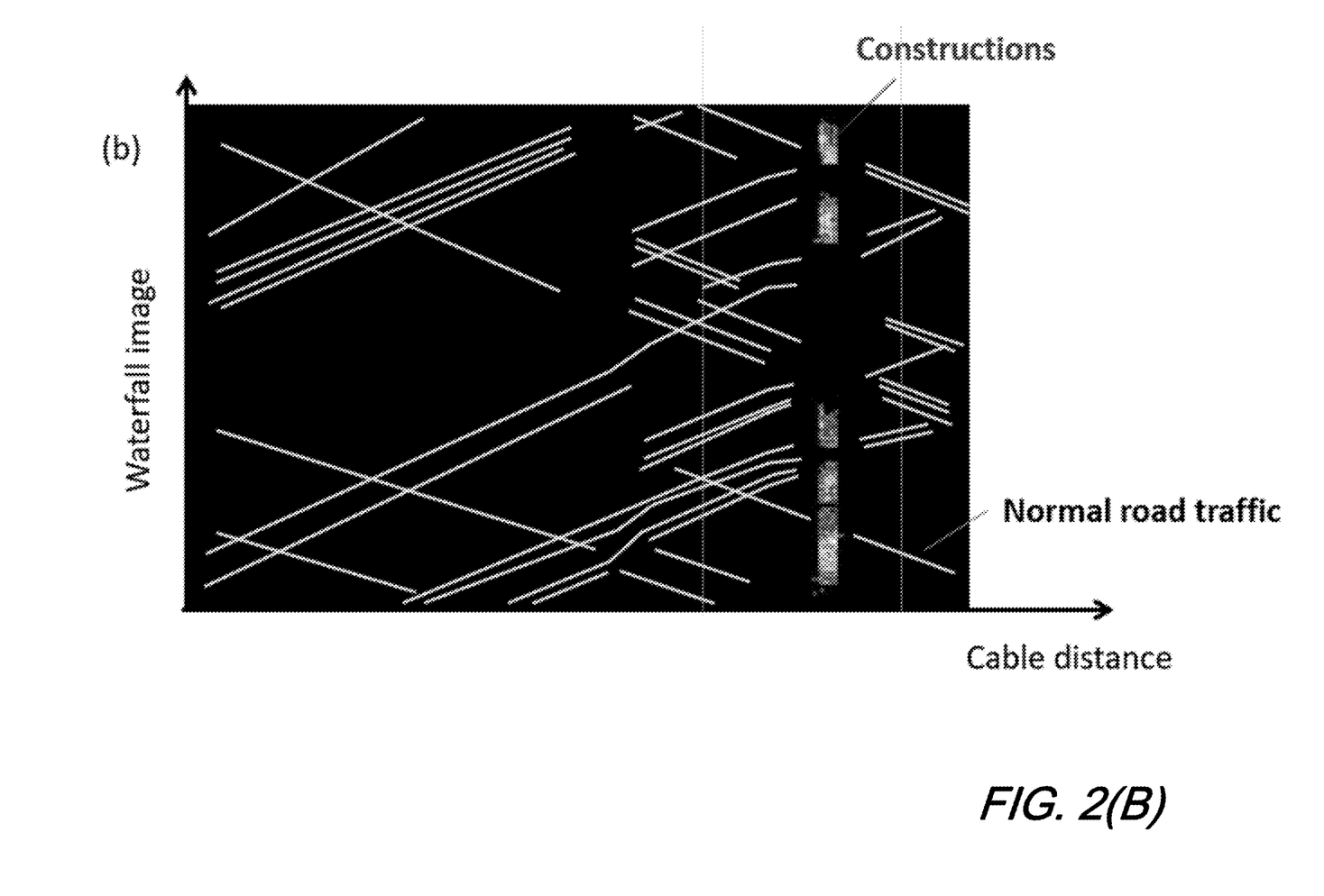

FIG. 2(A) and FIG. 2(B) show illustrative system layout of a sensing layer overlaid on a deployed optical fiber and a schematic received waterfall image from the fiber by DFOS that includes normal road traffic and constructions according to aspects of the present disclosure.

As shown in the figure, the distributed fiber optic sensing system (DFOS) and anomaly detector is positioned in a centralized control office and provides remote monitoring of an entire cable route. Operationally DFOS system is connected to the field optical fiber to provide sensing functions. The fiber can be a dark fiber or carrying live telecommunications traffic (i.e., an operational fiber) of one or more service providers.

FIG. 2(B) shows schematic diagrams of an illustrative received waterfall image generated by the DFOS system and is indicative of both detected normal road traffic and construction operations. In normal road traffic conditions, the road traffic patterns and environmental noise is detected and trained as normal patterns in A1 algorithms. Once construction operations occur proximate to the cable, distinctive patterns are discovered/determined from the waterfall traces and classified as abnormal events as determined by the context encoder-based anomaly detection system.

Figure 3:
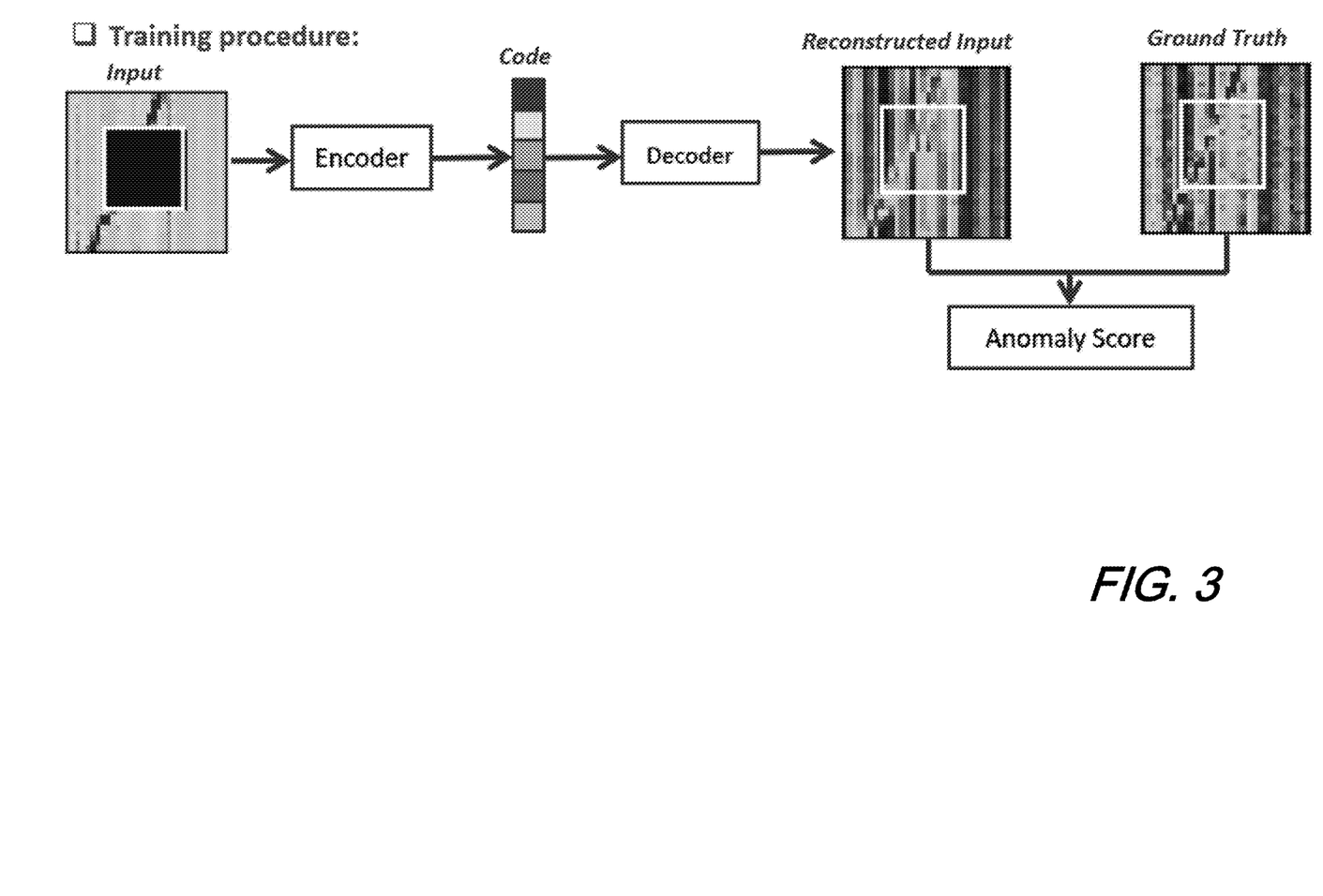
FIG. 3 is a schematic diagram illustrating training and testing effectiveness of our context encoder according to aspects of the present disclosure.

FIG. 3 is a schematic diagram illustrating training and testing effectiveness of our context encoder according to aspects of the present disclosure. More particularly the figure shows illustrative input images and illustrative output images of the context encoder. The center parts of the input images are set to zero. The model output produces a reconstruction, and the accuracy of this reconstruction is assessed by computing the reconstruction error such as L2 loss against the ground truth, which is always available. The abnormal score is derived by aggregating reconstruction errors from multiple patches within the time window at each cable points.

Figure 4:
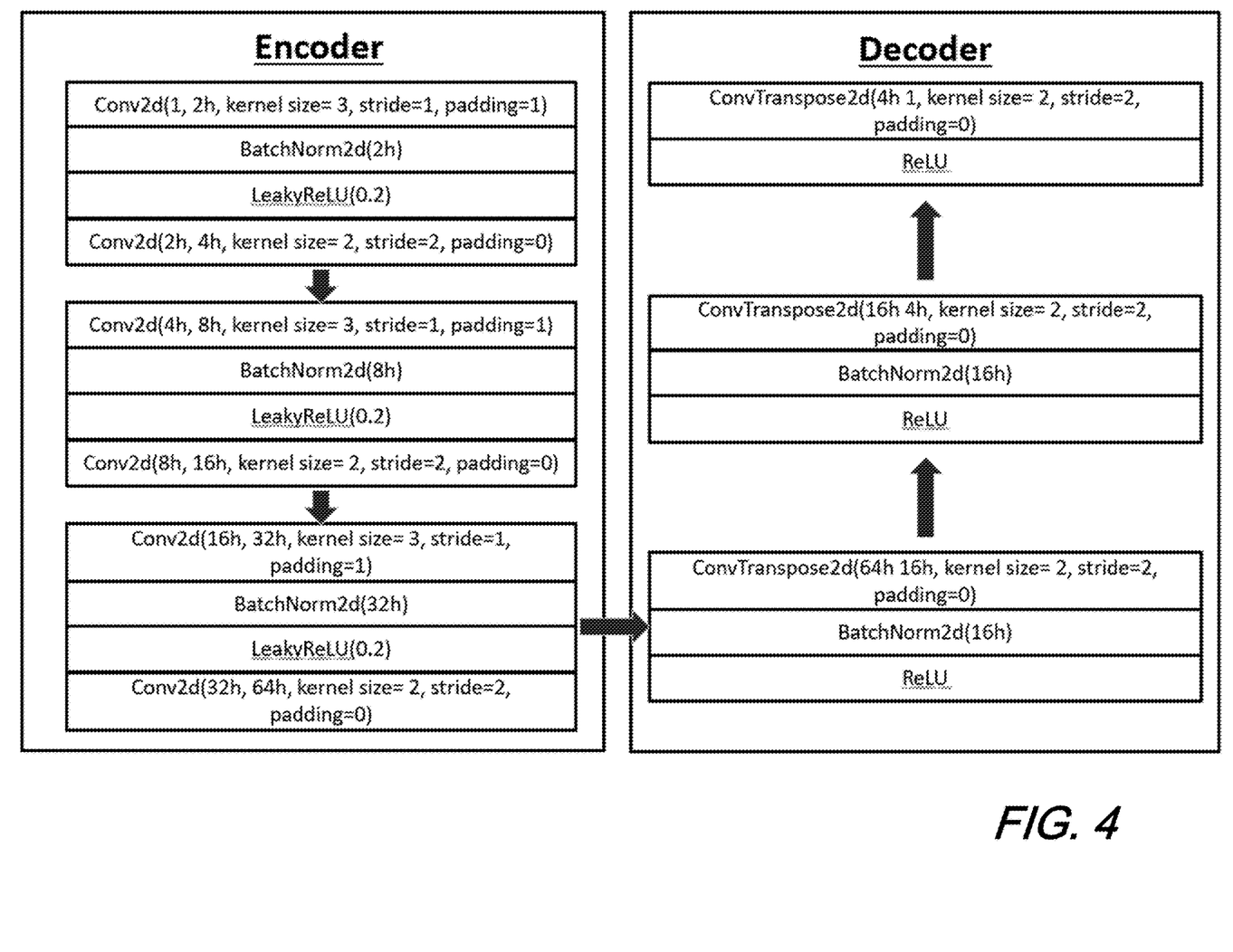
FIG. 4 is a schematic diagram showing an illustrative model architecture of our convolutional autoencoder/decoder according to aspects of the present disclosure.

FIG. 4 is a schematic diagram showing an illustrative model architecture of our convolutional autoencoder according to aspects of the present disclosure. With reference to that figure, it is noted that the encoder operates as the compress unit and decoder as the decompress unit and both include three layers.

In the encoder, each layer includes convolution, batch normalization, Leaky Relu activation, and convolution with stride for down sampling. In the decoder, upscaling is achieved by convolutional transpose operator.

Figure 5:
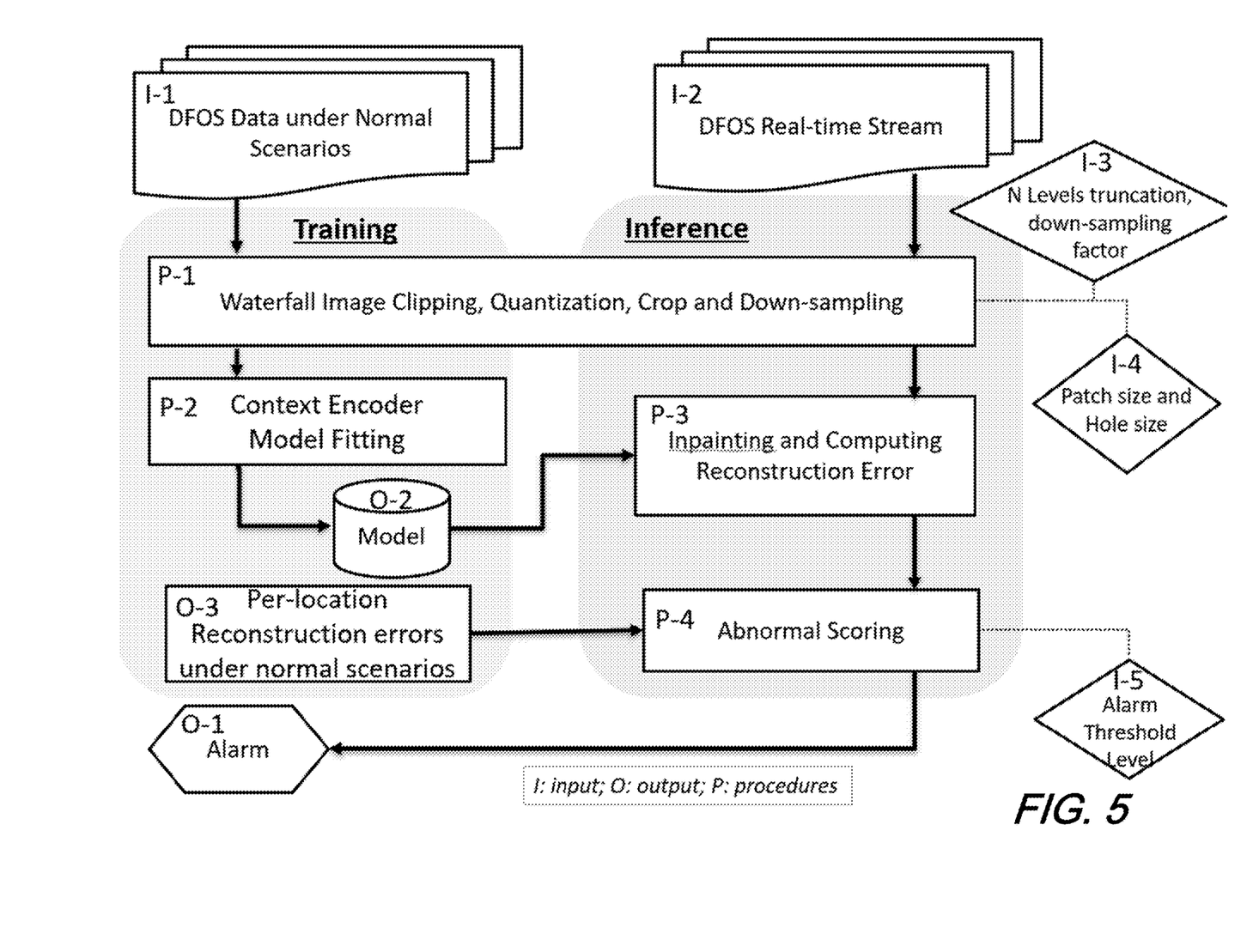
FIG. 5 is a schematic diagram illustrating data processing flow and system chart according to aspects of the present disclosure.
Figure 6:
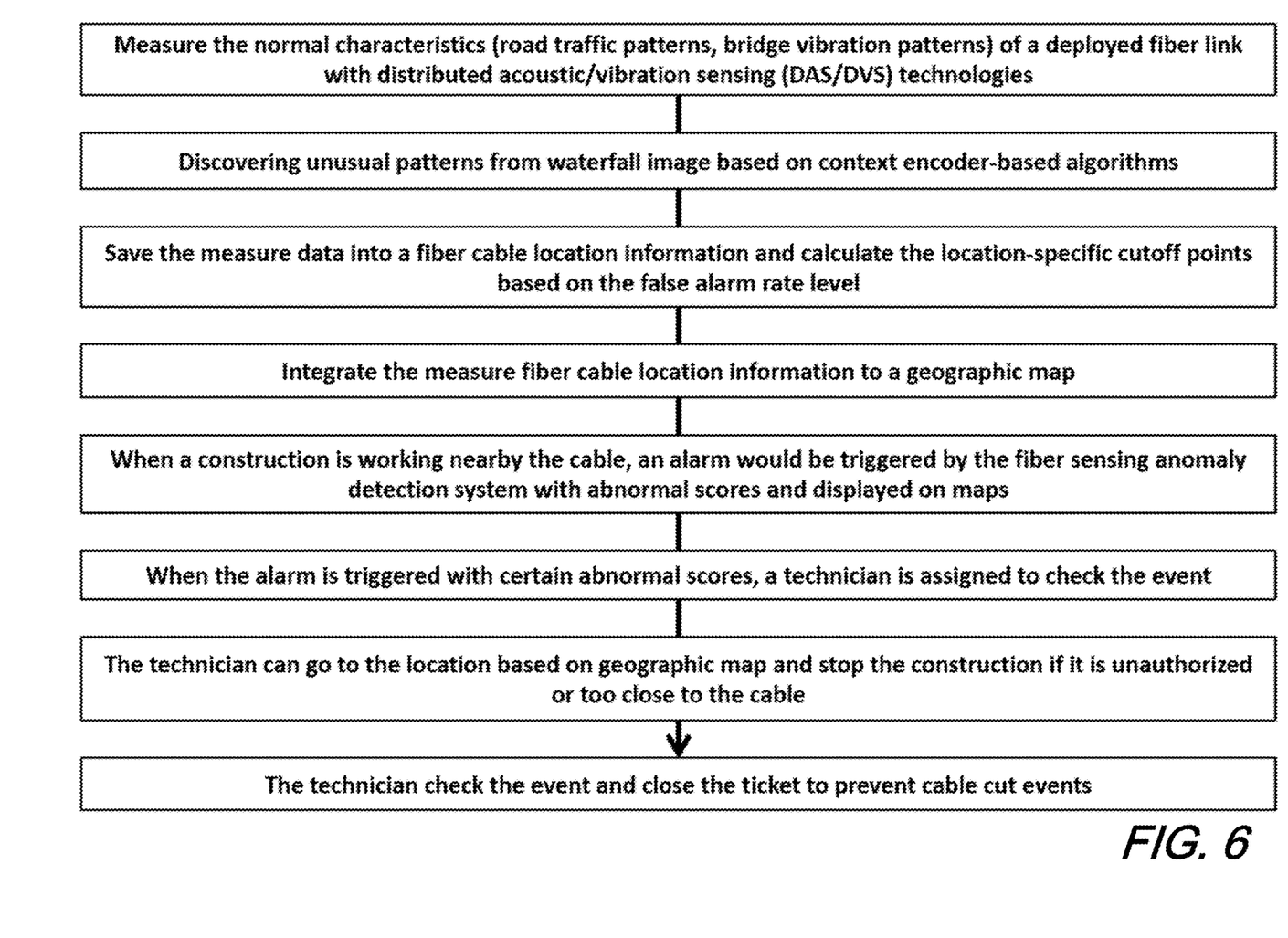
FIG. 6 is a flow diagram of an overall procedure according to aspects of the present disclosure.

FIG. 5 is a schematic diagram illustrating data processing flow and system chart according to aspects of the present disclosure includes the following elements.

Input:

1-1: DFOS Data under Normal Scenarios: Waterfall image data collected by DFOS system under normal conditions for training including road traffic and environmental surrounding noises.

1-2: DFOS Real-time Stream: Real-time waterfall stream for testing and detection.

1-3: N Levels truncation down-sampling factor: The quantile at which the waterfall intensity is truncated, and the number of levels (e.g. 64 or 128) after equal spacing quantization, downsize factor (4).

1-4: Patch size and Hole size: The size of the waterfall images (32×32) and the cropped hole (24×24).

1-5: Alarm threshold Level: A final alarm decision is made by continuous monitoring the waterfall and calculating the cumulative abnormal score across multiple time frames. A location-specific threshold is derived according to 0-3. For example, we expect higher reconstruction errors and therefore threshold in regions near the bridge. An alarm will be triggered if the abnormal score is higher than the threshold and displayed on a map Procedures:

P-1: Data Preprocessing: To standardize the input, the intensity values in waterfall image are first clipped at the specified quantile level (e.g., 0.95), quantized equally into N levels, and then downsized into a smaller size. Each input image has two copies—one with center part cropped, and another one serves as the ground truth.

P-2: Model training: The parameter of the specified model is learned, using data 1-1. The model is saved to 0-2. Meanwhile, the statistics of reconstruction errors under normal conditions are saved to 0-3. A location-specific threshold is derived from the distribution of reconstruction errors at user specified level 1-5.

P-3: Inference: Saved model 0-2 is loaded and applied to image patches with "holes" and compared against the ground truth copy for computing reconstruction error.

P-4: Thresholding: The abnormal score at each cable point is computed by taking the sum of reconstruction errors of model 0-2 on data 1-1 within a specified time window. Abnormal scores exceeds the threshold will trigger an alarm 0-1.

Figure 7:
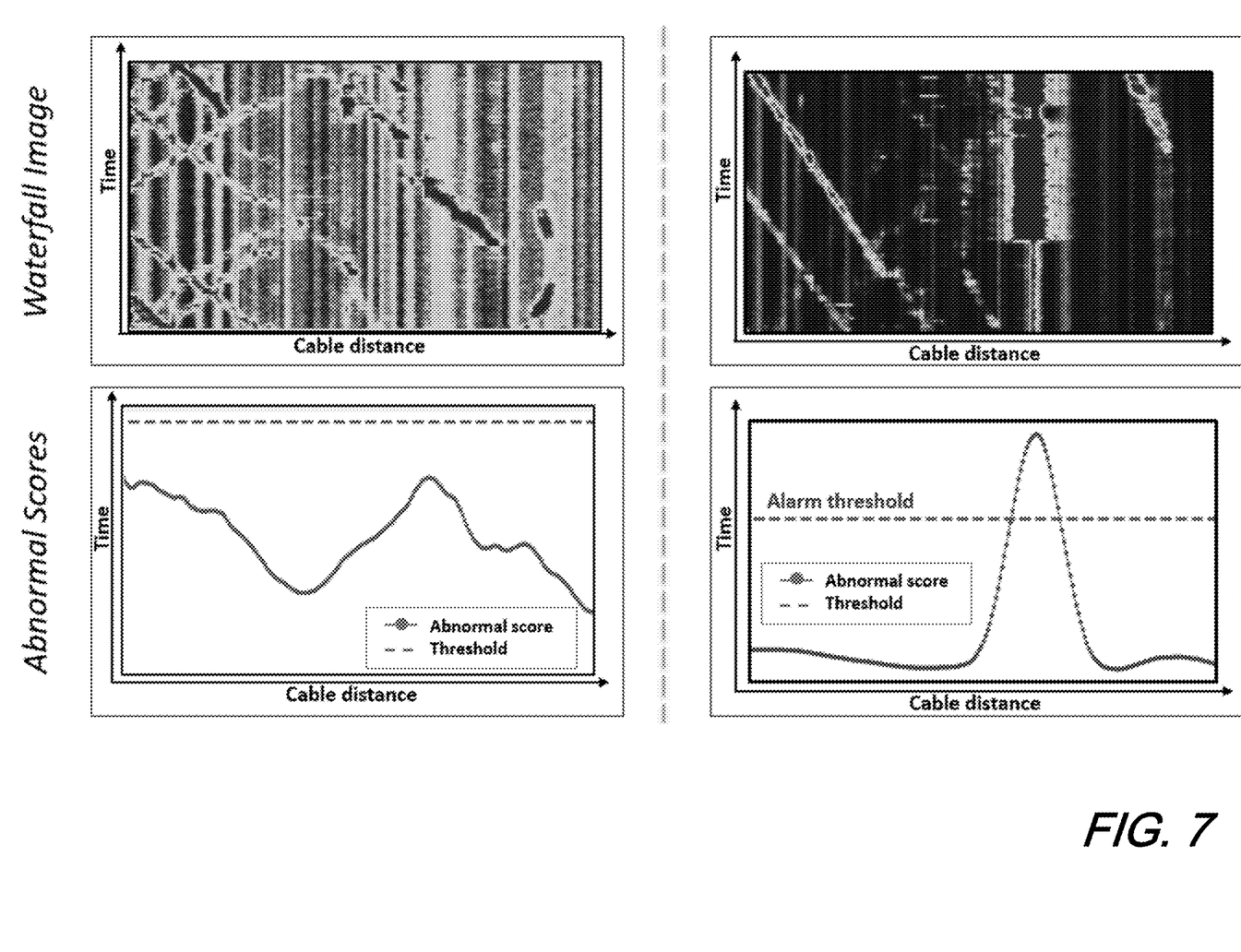
FIG. 7 shows schematic waterfall plots and abnormal score plots for construction activities obtained during a field trial according to aspects of the present disclosure.
Figure 8:
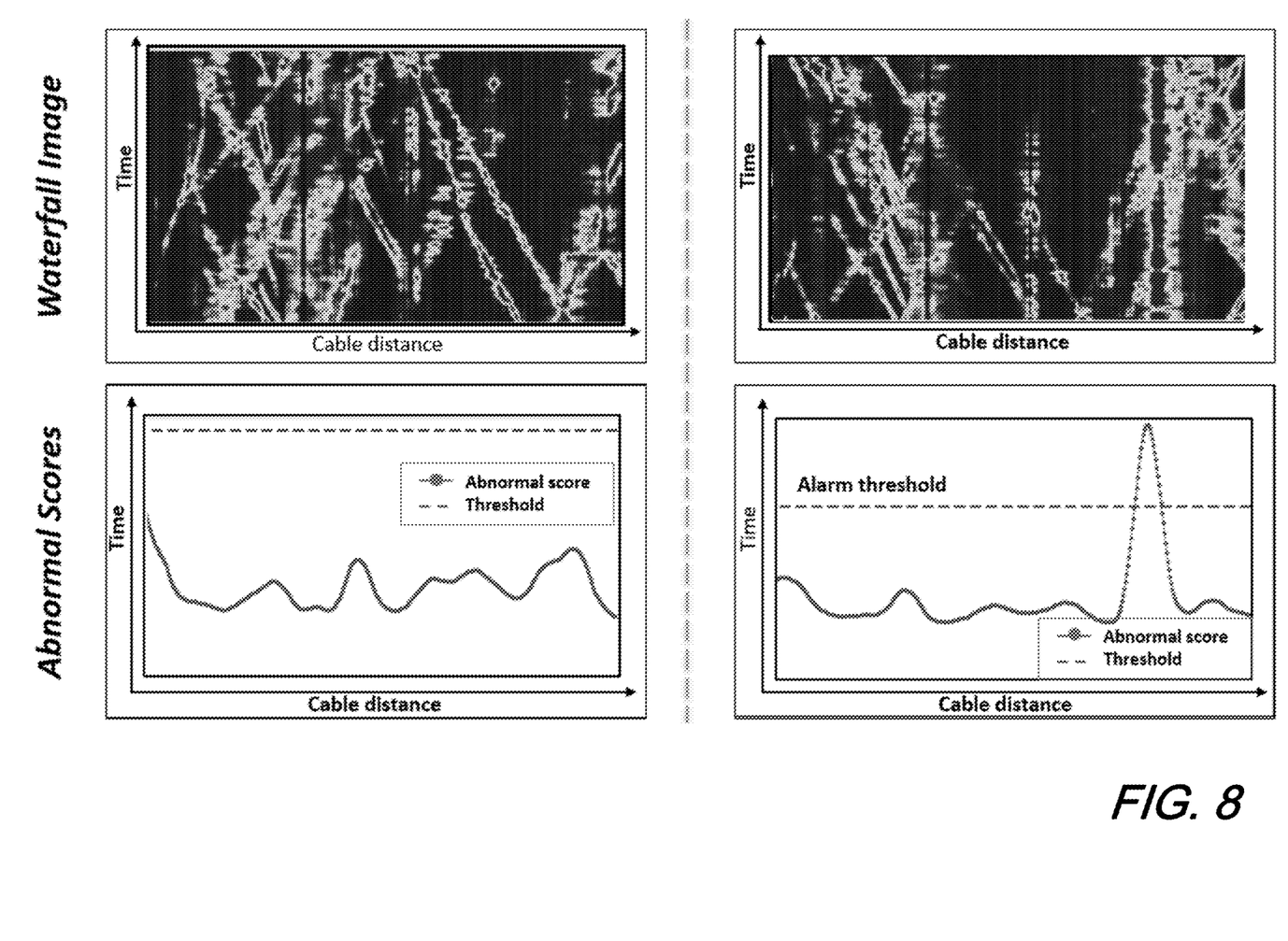
FIG. 8 shows schematic waterfall plots and abnormal score plots for construction activities obtained during a second field trial according to aspects of the present disclosure.
Figure 9:
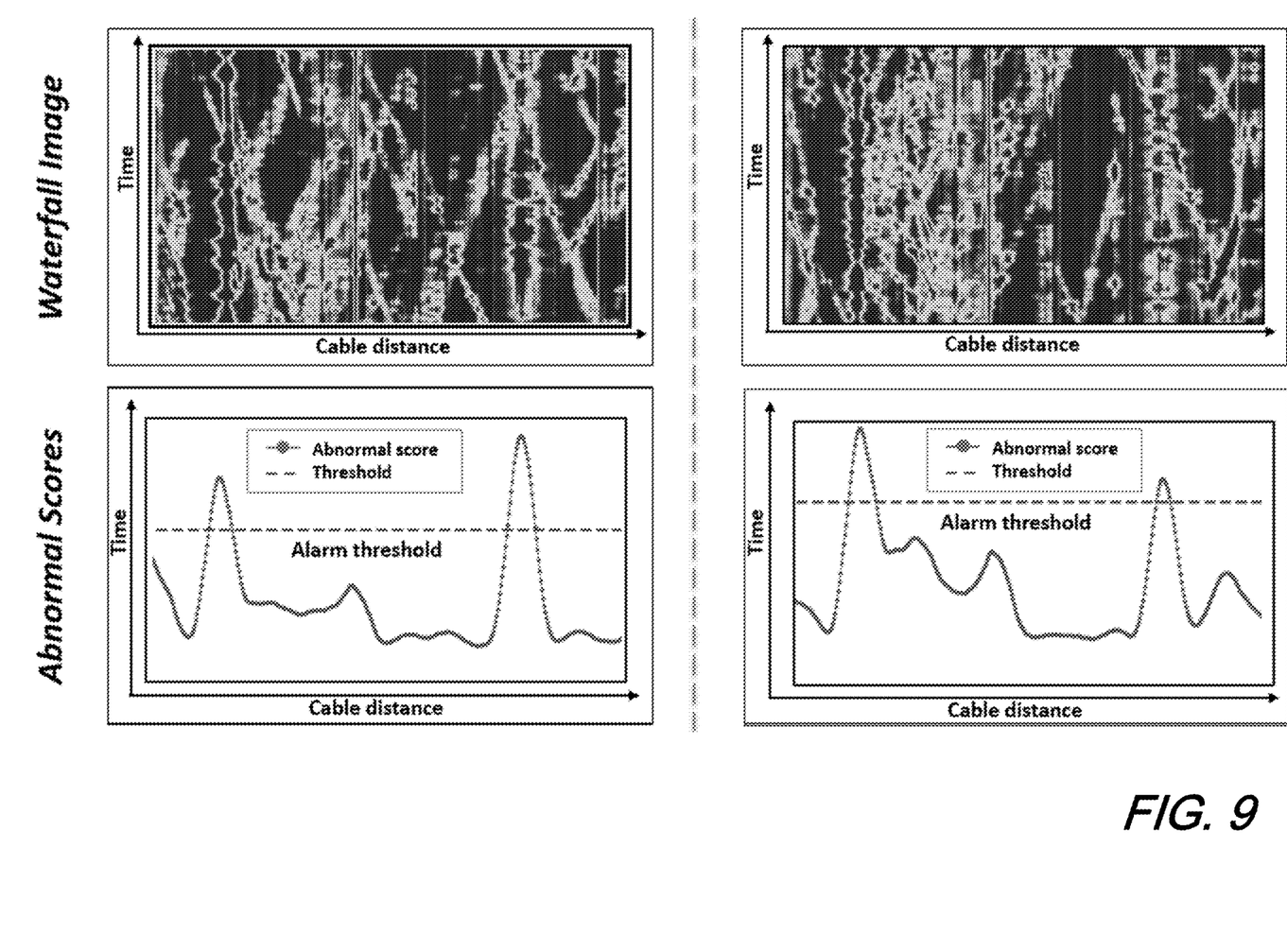
FIG. 9 shows schematic waterfall plots and abnormal score plots for construction activities obtained during a third field trial illustrating the detection of two abnormal events simultaneously according to aspects of the present disclosure.

Some examples of the proposed context encoder applied to waterfall images collected from field trials are shown illustratively in the figures in which: FIG. 7 shows schematic waterfall plots and abnormal score plots for construction activities obtained during a field trial according to aspects of the present disclosure; FIG. 8 shows schematic waterfall plots and abnormal score plots for construction activities obtained during a second field trial according to aspects of the present disclosure; and FIG. 9 shows schematic waterfall plots and abnormal score plots for construction activities obtained during a third field trial illustrating the detection of two abnormal events simultaneously according to aspects of the present disclosure.

Figure 10:
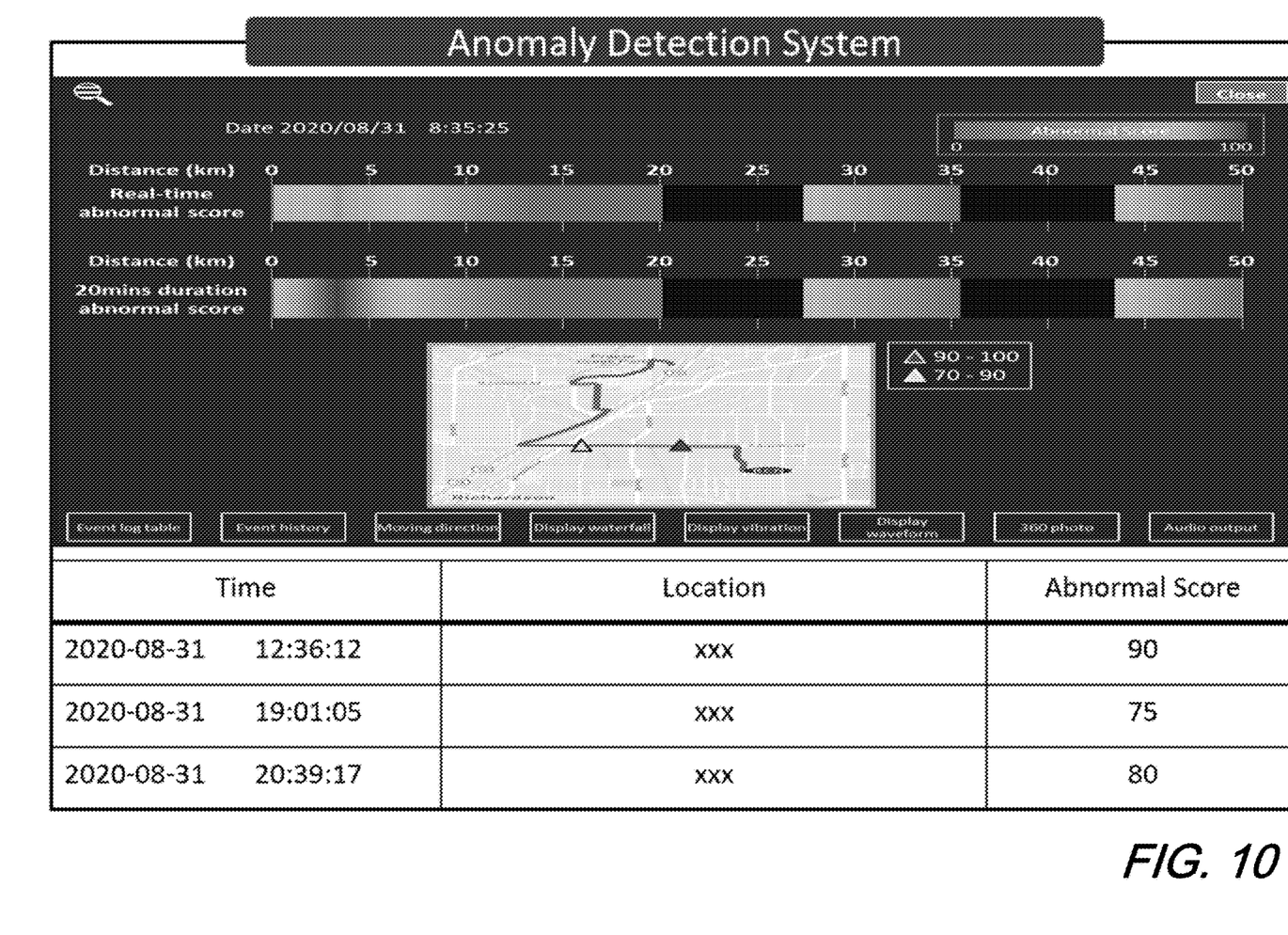
FIG. 10 shows schematic diagram of an illustrative user display including cable route information and detected anomaly for reporting to an operator according to aspects of the present disclosure.

Output:

0-1: Alarm: Detailed alarm display is shown and discussed with reference to FIG. 10 which shows a schematic diagram of an illustrative user display including cable route information and detected anomaly for reporting to an operator according to aspects of the present disclosure. Based on the abnormal scores, the technician can make decisions to check operation/integrity of the fiber optic cable 0-2: Model: Model trained specifically for each route.

0-3: Normal Statistics: The distribution of reconstruction errors of the specified model at the same location under normal scenarios.

At this point, while we have presented this disclosure using some specific examples, those skilled in the art will recognize that our teachings are not so limited. Accordingly, this disclosure should be only limited by the scope of the claims attached hereto.

The invention claimed is:

1. An unsupervised context-encoder method for operating a distributed fiber optic sensing (DFOS) system including a length of optical sensing fiber in optical communication with a DFOS interrogator and anomaly detector, said unsupervised method comprising:
providing the DFOS system wherein the optical sensing fiber is deployed proximate to a roadway;
in an unsupervised manner
operating the DFOS to obtain normal characteristics of the roadway including road traffic and other infrastructure vibration patterns proximate to the sensing fiber; and
determining, in real-time, from inpainted waterfall images generated during operation of the DFOS, unusual patterns in the waterfall images through the effect of a context encoder/decoder derived from data based on a false alarm rate level; and
self-training, in an end-to-end manner, and extending the context encoder/decoder every time the DFOS sensor fiber is optically connected to a new route;
wherein the unusual patterns are indicative of activities that threaten the integrity of the optical sensing fiber;
wherein the context encoder/decoder employs inpainting and is trained by receiving as input generated waterfall images and for each input image, generates two output images, a ground truth output image and a cropped image, the cropped image having a center portion of the input waterfall image set to zero, and a encoder/decoder model produces a reconstruction of the cropped image wherein the accuracy of the reconstruction is assessed by determining a reconstruction error against the ground truth and an abnormal score is derived by aggregating reconstruction errors.

2. The method of claim 1 wherein the optical sensing fiber is a deployed optical fiber that carries telecommunications traffic in addition to any DFOS signals.

3. The method of claim 2 wherein an encoder of the context encoder/decoder includes three layers, each individual layer having convolution, batch normalization, Leaky Relyu activation and convolution with stride for downsampling.

4. The method of claim 3 wherein a decoder of the of the context encoder/decoder includes three layers, each layer including a convolutional transpose operator.

* * * * *